United States Patent [19]
Walden

[11] 3,975,499
[45] Aug. 17, 1976

[54] SODIUM CARBONATE MONOHYDRATE CRYSTALLIZATION

[75] Inventor: John Walden, Hightstown, N.J.

[73] Assignee: FMC Corporation, Philadelphia, Pa.

[22] Filed: June 5, 1974

[21] Appl. No.: 476,560

[52] U.S. Cl. .............................. 423/266; 23/302 T; 423/206 T; 423/421
[51] Int. Cl.² ...................... C01D 7/24; C01D 7/40
[58] Field of Search ........... 423/179, 184, 204, 206, 423/206 T, 208, 265, 266, 421, 426; 23/295, 297, 300, 302

[56] References Cited
UNITED STATES PATENTS

| | | | |
|---|---|---|---|
| 2,670,269 | 2/1954 | Rahn | 423/426 |
| 2,954,282 | 9/1960 | Bauer et al. | 423/206 T |
| 3,037,849 | 6/1972 | Frint et al. | 23/300 |
| 3,072,466 | 1/1963 | Bauer et al. | 23/300 |
| 3,655,331 | 4/1972 | Seglin | 423/208 |
| 3,705,790 | 12/1972 | Garofano et al. | 423/206 T |
| 3,725,014 | 4/1973 | Poncha | 23/300 |
| 3,780,160 | 12/1973 | Waggener et al. | 23/302 |

FOREIGN PATENTS OR APPLICATIONS

| | | | |
|---|---|---|---|
| 4,626,102 | 7/1971 | Japan | 423/421 |

OTHER PUBLICATIONS

Riegel; E. R., Industrial Chemistry, 5th Edition, Reinhold Publishing Company, N.Y., N.Y., 1949, pp. 251–253, 261–266.

Primary Examiner—Oscar R. Vertiz
Assistant Examiner—Gary P. Straub

[57] ABSTRACT

Process for producing sodium carbonate monohydrate crystals having a high bulk density, blocky crystal shape, and uniform particle size distribution from sodium carbonate solutions wherein the sodium carbonate monohydrate is crystallized in the presence of magnesium ions and sodium dodecylbenzenesulfonate.

7 Claims, 11 Drawing Figures

SODIUM CARBONATE MONOHYDRATE CRYSTALLIZATION

This invention relates to an improved process for the production of sodium carbonate (soda ash) from crude trona.

In Sweetwater and adjacent counties in the vicinity of Green River, Wyo., trona deposits are found at depths ranging from about 800 to about 1800 feet underground. The main trona bed varies from 8 to 18 feet in thickness and other beds of less thickness separated by layers of shale are usually found above the main trona bed. The trana consists mainly of sodium sesquicarbonate ($Na_2CO_3 \cdot NaHCO_3 \cdot 2H_2O$) and four to six percent insoluble materials consisting mainly of shale. A typical analysis of the crude trona from which the larger pieces of shale have been removed is:

| Constituent | Percent |
| --- | --- |
| $Na_2CO_3$ | 43.50 |
| $NaHCO_3$ | 36.11 |
| $H_2O$ | 13.14 |
| $Na_2SO_4$ | 0.02 |
| $NaCl$ | 0.09 |
| $Fe_2O_3$ | 0.14 |
| Organic Matter | 0.30 |
| Insolubles | 6.70 |

Various processes for the production of sodium carbonate from crude trona are known. One such process is the monohydrate process, disclosed in U.S. Pat. No. 2,962,348 issued to Seglin et al on Nov. 29, 1960. In this process, crude trona, after being crushed and screened, is calcined directly to form crude sodium carbonate. The crude sodium carbonate is dissolved in an aqueous solvent to form a substantially saturated solution of crude sodium carbonate. The crude sodium carbonate solution is then clarified and/or filtered to remove insolubles and subsequently treated to crystallize sodium carbonate monohydrate, preferably in evaporative crystallizers. The monohydrate crystals are then calcined to produce a dense soda ash.

One difficulty that has arisen in the operation of the monohydrate process has been the presence of soluble organic impurities in the crude sodium carbonate solution during crystallization of the sodium carbonate. These organic impurities consists mainly of kerogenaceous material such as carboxylic acids, sodium salts of carboxylic acids, and rosin acids present in the trona as well as conventionally added organic surface active agents which are used to assist in the crystallization process. The production of sodium carbonate monohydrate crystals with high bulk densities and with uniform particle size distributions, however, is hindered by the presence of the soluble organic impurities even when the impurities are present in trace quantities. These impurities apparently interfere with the desirable growth of blocky crystals, that is, short, thick, sharp-angled crystals, and instead produce long, thin, rounded crystals which tend to break easily and cause objectionable dusting when handled. Furthermore, these latter crystals are difficult to separate from solution.

Various processes have been proposed to overcome this problem in an attempt to prepare good sodium carbonate monohydrate crystals. These processes have generally been concerned either with lowering the organic impurity concentration during sodium carbonate crystallization or with the use of a crystal growth additive during sodium carbonate monohydrate crystallization. British Pat. No. 1,211,984 discloses one method wherein the affect of the organic impurities upon sodium carbonate crystallization is reduced by growing sodium carbonate crystals at one crystallization temperature and then feeding separated mother liquor which has an increased organic impurity concentration relative to the initial feed liquor to another crystallizer operated at a higher temperature. When the organic carbon level of the liquor is between 300 ppm carbon and 5,000 ppm carbon calculated on a sodium carbonate solution basis, a portion of the liquor is purged from the crystallizers and discarded as waste. While this process produces acceptable bulk density crystals, operation of the process results in a substantial loss of valuable sodium carbonate values present in the discarded purge stream. U.S. Pat. No. 3,260,567 discloses the use of carbon towers to treat a clarified sodium carbonate solution with activated carbon prior to and after crystallization in order to remove a substantial portion of the soluble organic impurities. This process, however, requires constant maintenance and is often not capable of sufficiently reducing the soluble organic concentration.

Various methods have been proposed which disclose the use of inorganic and/or organic additives during crystallization. In U.S. Pat. No. 3,486,844, the crystallization step is performed in the presence of small amounts of silicate ions, sulfate ions, and a water-soluble carbohydrate gum. In Japanese Pat. No. 71/26,102, sodium carbonate monohydrate is prepared by crystallizing it from a solution containing 0.5 to 5% sodium sulfate decahydrate and up to 500 ppm anionic surfactant. In U.S. Pat. No. 3,459,497, sodium carbonate monohydrate is precipitated from an aqueous sodium carbonate solution containing calcium ions and magnesium ions. These processes, however, all have their disadvantages. They either require the use of expensive additives or elaborate testing procedures to produce a commercially saleable product. Furthermore, the sodium carbonate monohydrate crystals produced by these processes are generally of inferior quality, considering such factors as crystal shape, purity, size, uniformity, resistance to breakage, and bulk density.

An easy, efficient, and economic process has been unexpectedly discovered for producing sodium carbonate monohydrate crystals having a high bulk density, blocky crystal shape, and uniform particle size distribution by crystallizing sodium carbonate monohydrate from a sodium carbonate solution in the presence of about 20 to about 100 ppm $Mg^{+2}$ and about 5 to about 20 ppm sodium dodecylbenzenesulfonate.

The attached illustrations demonstrate the synergistic effect that $Mg^{+2}$ and sodium dodecylbenzenesulfonate have upon sodium carbonate crystal growth. These illustrations are photographic reproductions from reflective photomicrographs of sodium carbonate crystals produced in the presence of various additives. All mesh sizes are based upon U.S. Standard Mesh sizes.

These illustrations clearly demonstrate that sodium carbonate crystals produced according to this invention have a high bulk density; blocky crystal shape; and uniform particle size distribution. These properties are extremely desirable since the crystals can be easily separated from solution, easily dried, and are less friable so they can be handled easily without breakage and without objectionable dusting. These crystal properties also decrease the segregating tendencies of the crystals when used in commercial formulations, which is commercially important. Furthermore, the consistant formation of a sodium carbonate product with uniform particle size distibution permits a commercial operation to continuously produce a consistently good product without property fluctuation.

The term high bulk density as used herein refers to sodium carbonate crystals having bulk densities from about 50 to about 65 lbs/ft³. The term blocky crystal shape refers to sodium carbonate crystals which are short, thick, and sharp-angled, that is, crystals which are almost cubic in form. The shape of the crystals is determined from the ratio of crystal width ($a$ axis) to crystal length ($b$ axis) to crystal thickness ($c$ axis) represented as the crystal axis ratio $a:b:c$. In order to have a meaningful measurable ratio, the $b$ axis is assigned the constant number 1, and the $a$ and $c$ axes are measured in relation to the $b$ axis. Consequently, a blocky sodium carbonate crystal is a crystal having both an $a$ and $c$ axes close to 1. These axes should not be 1 however since this would be a cubic sodium carbonate crystal shape and the most desirable sodium carbonate crystal shape is in the form of a hexangular column. The further away the $a$ axis and $c$ axis numbers are to 1, the more the crystals become longer in the $b$ axis and thinner in the $c$ axis. The term uniform particle size distribution refers to the uniformity or consistency of the sodium carbonate crystal particle size distribution produced during crystallization in relation to time, that is, the crystals having uniform particle size distributions during the entire crystallization process. When the particle size distribution varies during crystallization, the article size distribution is not uniform. Non-uniform particle size distribution is often called "crystal cycling".

In the practice of this invention, an aqueous sodium carbonate solution produced according to standard commercial sodium carbonate monohydrate processes is subjected to crystallization in the presence of $Mg^{+2}$ (magnesium ions) and sodium dodecylbenzenesulfonate. Any soluble magnesium salt may be employed in the invention. These salts may be added to the sodium carbonate solution as salts, or as a solution containing the magnesium salt dissolved therein. Magnesium sulfate is the preferred salt due to its good solubility and economic cost. Magnesium sulfate can be replaced in whole or part with magnesium bromate; magnesium bromide; magnesium chlorate; magnesium chloride; magnesium iodide; magnesium nitrate; magnesium sulfite; and magnesium silicofluoride. Even though dodecylbenzenesulfonate is preferably added as a sodium salt, other alkali metal salts such as potassium, lithium, and rubidium may be employed, as well as the acid form itself, that is, dodecylbenzenesulfonic acid.

The amount of additive that must be present in the sodium carbonate solution from which sodium carbonate is crystallized will vary, for example, on such factors as the amount of sodium carbonate present in the solution, the soluble organic impurity concentration, and the temperature at which the crystallization is performed. Generally, the additives are employed in amounts of about 20 to about 100 ppm (parts per million) $Mg^{+2}$ and about 5 to about 20 ppm sodium dodecylbenzenesulfonate based on the sodium carbonate solution. These amounts have been found effective for treating commercially prepared sodium carbonate crystallizer feed solutions containing about 5 to about 550 ppm carbon based on the sodium carbonate solution. Preferably, the sodium carbonate solution is contacted with about 40 to about 60 ppm $Mg^{+2}$ and about 6 to about 15 ppm sodium dodecylbenzenesulfonate. Most preferably, the sodium carbonate solution is contacted with about 50 ppm $Mg^{+2}$ and about 10 ppm sodium dodecylbenzenesulfonate. Obviously, as the soluble organic impurity concentration decreases or increases, the additive is employed in either decreasing or increasing amounts respectively. The exact amount of additive that must be employed can readily be determined by those skilled in the art. Concentrations of $Mg^{+2}$ above about 100 ppm should not be employed since these higher concentrations result in the formation of sodium carbonate crystals which are excessively nucleated and striated. Furthermore, non-uniform particle size distributions and large amounts of fines are produced. Concentrations of sodium dodecylbenzenesulfonate above about 20 ppm should not be employed. These high concentrations result in the formation of striated, rounded crystals. Furthermore, non-uniform particle size distributions and large amounts of fines are produced.

Sodium carbonate crystallization must be preformed in the presence of both $Mg^{+2}$ and sodium dodecylbenzenesulfonate. If either of these additives are not present during crystallization, sodium carbonate crystal growth will be severely changed. For example, when $Mg^{+2}$ is employed as the sole additive during crystallization, the sodium carbonate crystals produced are longer than those produced in the presence of both additives. Furthermore, the particle size distribution fluctuates much more severely than when both additives are employed. When sodium dodecylbenzenesulfonate is employed as the sole additive, the crystals produced are long, thin, and rounded.

While the exact mechanism for producing sodium carbonate crystals by the present invention is not known for certainty, it is apparent that these additives when used together have a synergistic effect to produce sodium carbonate crystals having a high bulk density, blocky crystal shape, and uniform particle size distribution. It is not certain whether they act directly to produce such results or whether they merely block the undesirable effect of the soluble organic impurities present in the sodium carbonate solution.

The additives may be incorporated in the sodium carbonate solution either prior to and/or during crystallization. The prior addition may be done by adding the additives directly to the sodium carbonate solution when the solution is held in a storage vessel from which the solution is fed into a crystallizer or it may be done by simply adding the additive to the sodium carbonate solution as it is fed into a crystallizer. The preferred method is to add the sodium dodecylbenzenesulfonate to the sodium carbonate solution prior to crystallization and then add the $Mg^{+2}$ to the sodium carbonate solution containing the sodium dodecylbenzenesulfonate during crystallization. When the additives are added during crystallization, the additives are preferably added continuously to the sodium carbonate solution so that as the additives are used up, additional additive is present to maintain the desired crystal growth. The crystallization process may be carried out in batch or continuous fashion.

The invention will be better understood from a consideration of the following examples, and a reference to the attached illustrations. These illustrations clearly demonstrate the invention described and explained herein. All percentages are based upon weight unless otherwise indicated.

EXAMPLE 1

In order to show the beneficial effects of the additives herein described on the crystallization of sodium carbonate monohydrate, a number of separate saturated solutions of sodium carbonate (30% $Na_2CO_3$) were prepared by dissolving trona ore calcined at 200°C in 85°C distilled water. The solutions were then clarified and filtered and subjected to crystallization as set forth below in the various runs. Crystallization was carried out by pouring 250 milliliters of the above solutions into a vessel. The solutions contained about 235 ppm carbon based on the sodium carbonate solution. The solutions in the vessel were heated to the boiling point, 104°C, and maintained at this temperature until half of the initial volume of the solutions were evaporated. The slurry produced was then centrifuged, and the sodium carbonate monohydrate crystals dried. Analysis of the mother liquor for ppm carbon revealed that the mother liquor contained about 530 ppm carbon based on the sodium carbonate solution.

COMPARATIVE RUN A

Figure 1:
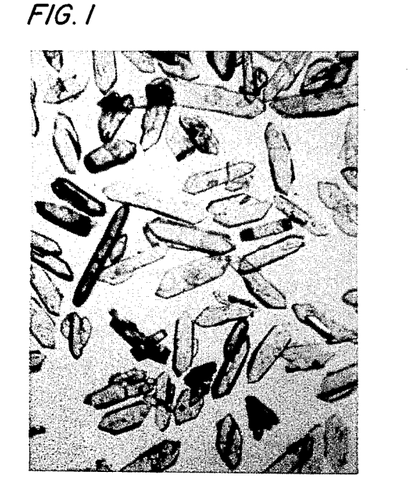
FIG. 1 shows crystals (−70 +100 mesh) taken at 30×magnification, prepared in the absence of additives.

In Comparative Run A, no additives were present during crystallization. The crystals produced showed some twinning and were long in the $b$ axis, thin in the $c$ axis, and poorly shaped. These crystals are illustrated in FIG. 1. Product specifications are set forth in Table I.

COMPARATIVE RUN B

Figure 2:
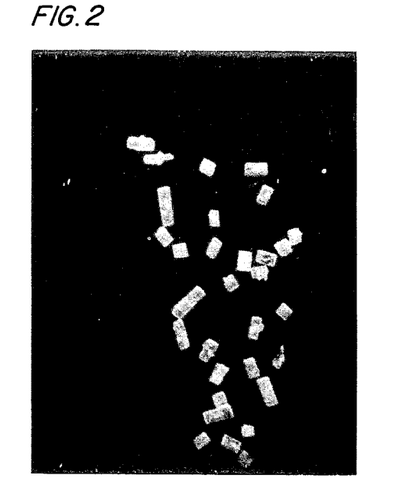
FIG. 2 shows crystals (−70 +100 mesh) taken at 15.5× magnification, prepared in the presence of 50 ppm $Mg^{+2}$.

In Comparative Run B, a magnesium sulfate solution prepared by dissolving 0.025 g $MgSO_4$ in 25 ml water was continuously added to the sodium carbonate solution present in the vessel after the solution reached the boiling point, 104°C, until a total of 50 ppm $Mg^{+2}$ had been added. The crystals produced showed minor twinning, and were long in the $b$ axis, and thick in the $c$ axis. These crystals are illustrated in FIG. 2. Product specifications are set forth in Table I.

COMPARATIVE RUN C

Figure 3:
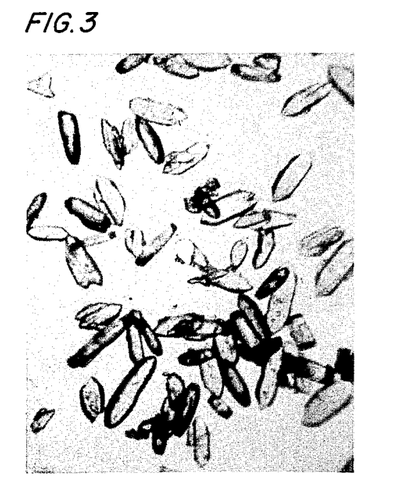
FIG. 3 shows crystals (−70 +100 mesh) taken at 30× magnification, prepared in the presence of 10 ppm sodium dodecylbenzenesulfonate.

In Comparative Run C, 10 ppm sodium dodecylbenzenesulfonate was added in bulk to the sodium carbonate solution in the vessel. The solution was then heated to the boiling point, 104°C. The crystals produced showed some twinning, some agglomeration, and were long in the $b$ axis, thin in the $c$ axis, and poorly shaped. These crystals are illustrated in FIG. 3. Product specifications are set forth in Table I.

RUN 1 - PROCESS OF INVENTION

Figure 4:
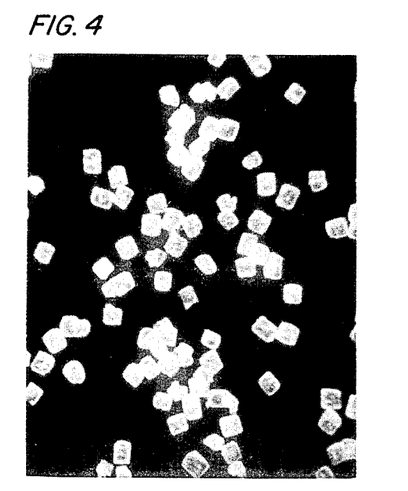
FIG. 4 shows crystals (−70 +100 mesh) taken at 15.5× magnification, prepared in the presence of 50 ppm $Mg^{+2}$ and 10 ppm sodium dodecylbenzenesulfonate.

In Run 1, 10 ppm sodium dodecylbenzenesulfonate was added in bulk to the sodium carbonate solution in the vessel. After the vessel reached the boiling point, 104°C, a magnesium sulfate solution prepared by dissolving 0.025 g $MgSO_4$ in 25 ml water was continuously added to the sodium carbonate solution present in the vessel until a total of 50 ppm $Mg^{+2}$ had been added. The crystals produced showed no twinning, no agglomeration, had sharp angles, and were blocky, that is, were short in the $b$ axis, and thick in the $c$ axis. These crystals are illustrated in FIG. 4. Product specifications are set forth in Table I.

Run 1 demonstrates the synergistic effect that $Mg^{+2}$ and sodium dodecylbenzenesulfonate have upon sodium carbonate crystal growth. These additives promoted crystal growth in the $c$ axis, negating the action of the soluble organic impurities which otherwise would have produced crystals having an elongated $b$ axis and/or a thin $c$ axis.

The sodium carbonate solution used in this example, not only contained 235 ppm carbon, but also contained 1500 ppm $Na_2SO_4$. As is apparent from Comparative Runs B and C, the presence of $Na_2SO_4$ with $Mg^{+2}$ (Run B) or sodium dodecylbenzenesulfonate (Run C) did not result in good crystal growth.

EXAMPLE 2

Clarified and filtered saturated solutions of crude sodium carbonate (30% $Na_2CO_3$) containing 50 ppm carbon based on the sodium carbonate solution were prepared by dissolving calcined trona ore, calcined at 175°C and containing about 10% by weight insoluble matter, in 85°C distilled water. After agitating and settling the solutions, the solutions were filtered to remove a substantial portion of the suspended insolubles smaller than about 40 mesh and passed through a twelve feet long by two inch diameter packed bed of activated granular carbon maintained at 75°C. The carbon-treated solutions were poured into a vessel, and heated at 104°C and at atmospheric pressure. Water was evaporated from the solutions until the solutions contained 424 ppm carbon based on the sodium carbonate solution. The solutions were then decanted and filtered. Crystallization was carried out by pouring 250 milliliters of the decanted and filtered solutions into a vessel. The solutions in the vessel were then heated to the boiling point, 104°C, and maintained at this temperature until half of the initial volume of the solutions were evaporated under the conditions set forth below in the various runs. The slurry produced was then centrifuged and the sodium carbonate monohydrate crystals were dried. Analysis of the mother liquor for ppm carbon revealed that the mother liquor contained about 932 ppm carbon based on the sodium carbonate solution.

COMPARATIVE RUN D

Figure 5:
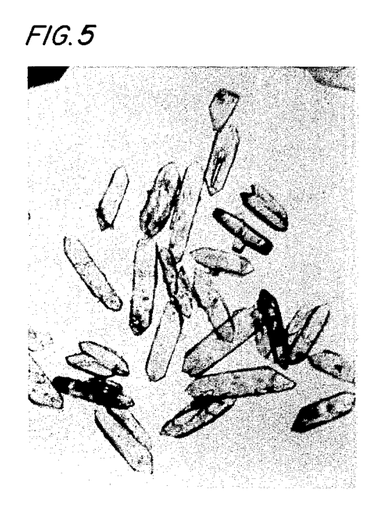
FIG. 5 shows crystals (−50 +100 mesh) taken at 30× magnification, prepared in the absence of additives.

In Comparative Run D, no additives were present during crystallization. The crystals produced showed some twinning, and were long in the $b$ axis, thin in the $c$ axis, and poorly shaped. These crystals are illustrated in FIG. 5. Product specifications are set forth in Table II.

RUN 2 - PROCESS OF INVENTION

Figure 6:
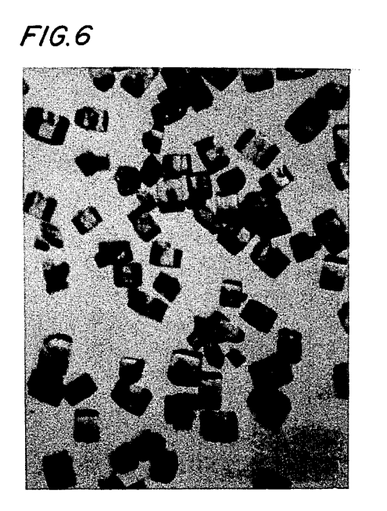
FIG. 6 shows crystals (−70 +100 mesh) taken at 30× magnification, prepared in the presence of 50 ppm $mg^{+2}$ and 10 ppm sodium dodecylbenzenesulfonate, wherein $Mg^{+2}$ is added continuously to the sodium cabonate solution containing the sodium dodecylbenzenesulfonate during crystallization.

In Run 2, 10 ppm sodium dodecylbenzenesulfonate was added in bulk to the sodium carbonate solution in the vessel. After the vessel reached the boiling point, 104°C, a magnesium sulfate solution prepared by dissolving 0.025 $MgSO_4$ in 25 ml water, was continuously added to the sodium carbonate solution present in the vessel until a total of 50 ppm $Mg^{+2}$ had been added. The crystals produced had sharp angles, and were blocky, that is, were short in the $b$ axis, and thick in the $c$ axis. These crystals are illustrated in FIG. 6. Product specifications are set forth in Table II.

RUN 3 - PROCESS OF INVENTION

Figure 7:
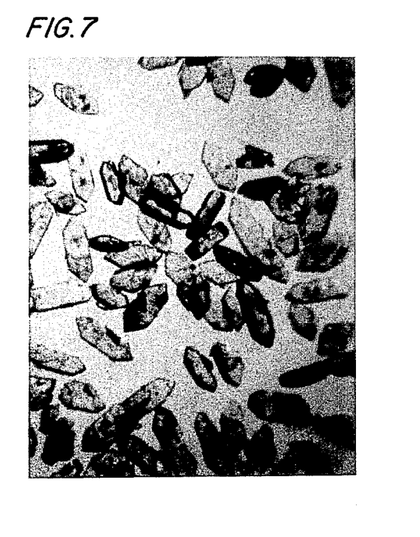
FIG. 7 shows crystals (−70 +100 mesh) taken at 30× magnification, prepared in the presence of 50 ppm $Mg^{+2}$ and 10 ppm sodium dodecylbenzenesulfonate, wherein both additives were added in bulk to the sodium carbonate solution prior to crystallization.

In Run 3, 10 ppm sodium dodecylbenzenesulfonate and 50 ppm $Mg^{+2}$ as magnesium sulfate were added in bulk to the sodium carbonate solution in the vessel prior to crystallization. The solution was then heated to the boiling point, 104°C. The crystals produced had relatively sharp angles, and were blockier than the crystals produced in Run D. The Run 3 crystals were not as short in the $b$ axis or as thick in the $c$ axis as the Run 2 crystals. These crystals are illustrated in FIG. 7. Product specification are set forth in Table II.

EXAMPLE 3

Saturated solutions of sodium carbonate (30% $Na_2CO_3$) containing 459 ppm carbon based on the sodium carbonate solution were prepared. Crystallization was carried out by pouring 300 milliliters of the solutions into a vessel. The solutions in the vessel were then heated to the boiling point, 104°C, and maintained at this temperature until half of the initial volume of the solutions were evaporated under the conditions set forth in the various runs below. The slurry produced was then centrifuged and the sodium carbonate monohydrate crystals were dried. Analysis of the mother liquor for ppm carbon revealed that the mother liquor contained over 1,000 ppm carbon based on the sodium carbonate solution.

COMPARATIVE RUN E

Figure 8:
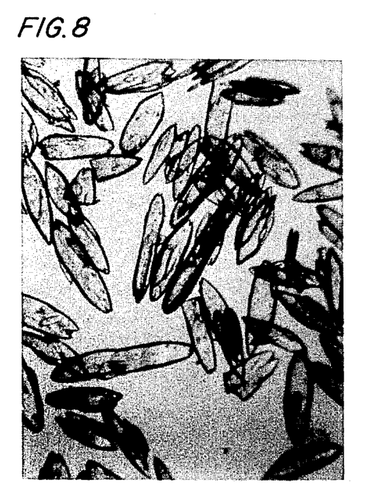
FIG. 8 shows crystals (−70 +100 mesh) taken at 30× magnification, prepared in the absence of additives.

In Comparative Run E, no additives were present during crystallization. The crystals produced showed some twinning, and were long in the $b$ axis, thin in the $c$ axis, and poorly shaped. These crystals are illustrated in FIG. 8. Product specifications are set forth in Table III.

RUN 4 - PROCESS OF INVENTION

Figure 9:
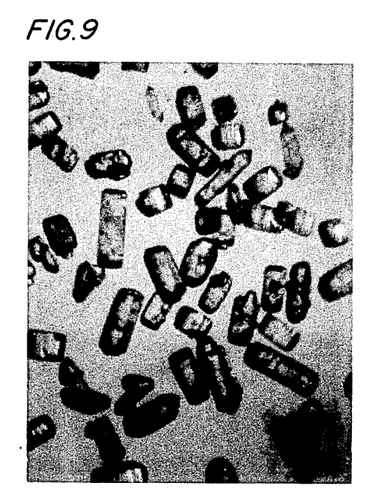
FIG. 9 shows crystals ((−70 +100 mesh) taken at 30× magnification, prepared in the presence of 50 ppm $Mg^{+2}$ and 20 ppm sodium dodecylbenzenesulfonate.

In Run 4, 20 ppm sodium dodecylbenzenesulfonate was added in bulk to the sodium carbonate solution in the vessel. After the vessel reached the boiling point, 104°C, a magnesium sulfate solution prepared by dissolving 0.099 grams $MgSo_4$ in 25 ml water was continuously added to the sodium carbonate solution present in the vessel until a total of 50 ppm $Mg^{+2}$ had been added. The crystals produced were slightly rounded, and the crystal surface was not smooth. The crystals, however, were slightly blocky, that is, the $b$ axis was shortened, and the $c$ axis was thickened. These crystals are illustrated in FIG. 9. Product specifications are set forth in Table III.

RUN 5 - PROCESS OF INVENTION

Figure 10:
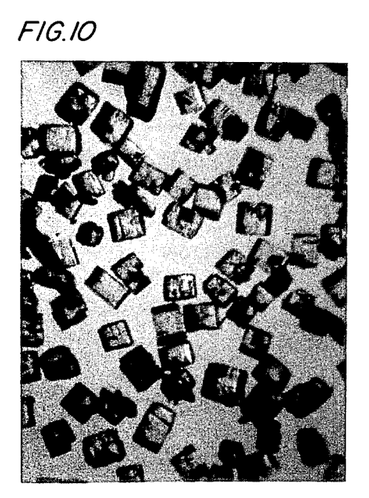
FIG. 10 shows crystals (−70 +100 mesh) taken at 30× magnification, prepared in the presence of 100 ppm $Mg^{+2}$ and 20 ppm sodium dodecylbenzenesulfonate.

In Run 5, 20 ppm sodium dodecylbenzenesulfonate was added in bulk to the sodoium carbonate solution in the vessel. After the vessel reached the boiling point, 104°C, a magnesium sulfate solution prepared by dissolving 0.198 grams $MgSO_4$ in 25 ml water was continuously added to the sodium carbonate solution present in the vessel until a total of 100 ppm $Mg^{+2}$ had been added. The crystals produced were partially striated and were blocky, that is, were short in the $b$ axis, and thick in the $c$ axis. These crystals are illustrated in FIG. 10. Product specifications are set forth in Table III.

RUN 6 - PROCESS OF INVENTION

In Run 6, 10 ppm sodium dodecylbenzenesulfonate was added in bulk to the sodium carbonate solution in the vessel. After the vessel reached the boiling point, 104°C, a magnesium sulfate solution prepared by dissolving 0.040 grams $MgSO_4$ in 25 ml water was continuously added to the sodium carbonate solution present in the vessel until a total of 20 ppm $Mg^{+2}$ had been added. The crystals produced showed no twinning, had relatively sharp angles, and were blockier than the crystals produced in Run E. The Run 6 crystals were as short in the $b$ axis as the Run 4 crystals but were thinner in the $c$ axis than the Run 4 crystals. The Run 6 crystals, however, were substantially better than the crystals produced in Run E. Product specifications are set forth in Table III.

COMPARATIVE RUN F

Figure 11:
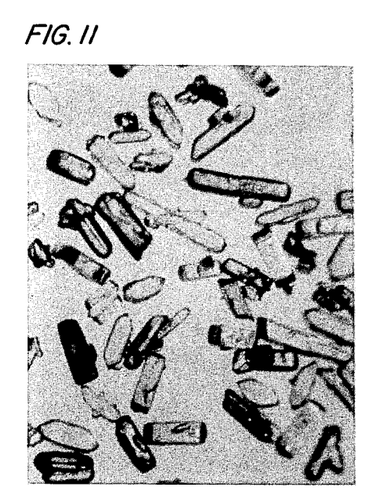
FIG. 11 shows crystals (−70 +100 mesh) taken at 30× magnification, prepared in the presence of 50 ppm $Mg^{+2}$ and 100 ppm $Ca^{+2}$.

In Comparative Run F, a magnesium sulfate and calcium chloride solution prepared by dissolving 0.99 grams $MgSO_4$ and 0.110 grams $CaCl_2$ in 25 ml water was continuously added to the sodium carbonate solution present in the vessel after the solution reached the boiling point, 104°C, until a total of 50 ppm $Mg^{+2}$ and 100 ppm $Ca^{+2}$ had been added. The crystals produced showed some twinning, and were long in the $b$ axis, thin in the $c$ axis and poorly shaped. These crystals are illustrated in FIG. 11. Product specifications are set forth in Table III.

EXAMPLE 4

Saturated solutions of sodium carbonate (30% $Na_2CO_3$) were prepared by dissolving trona ore calcined at 200°C in 85°C distilled water. The solutions were poured into a vessel and heated at 104°C and at atmospheric pressure. Water was evaporated from the solutions until the solutions contained 235 ppm carbon based on the sodium carbonate solution. The solutions were then decanted and filtered to remove sodium carbonate monohydrate crystals.

A 500 ml laboratory crystallizer was then filled with approximately 274 ml each of the decanted saturated sodium carbonate solution. The solutions were seeded with sodium carbonate monohydrate crystals and the slurry density adjusted to 30 weight percent solids by evaporating water at 104°C. After the desired slurry density was obtained, the crystallizer was stabilized at a temperature of 104°C and at 1 atmosphere pressure, and a water evaporation rate of 1.22 ml/min was maintained. Portions of the slurry were removed from the crystallizer at a constant rate. The removed water and slurry were recycled to the crystallizer and a steady state condition established. This procedure was carried out in continuous fashion for a running time of approximately 26 hours under the conditions set forth in the various runs below. At the end of this period, the slurry was centrifuged and the sodium carbonate monohydrate crystals were dried. Analysis of the mother liquor for ppm carbon revealed that the mother liquor contained about 530 ppm carbon based on the sodium carbonate solution.

COMPARATIVE RUN G

In Comparative Run G, no additives were present during crystallization. The crystals produced showed some twinning, and were long in the $b$ axis, thin in the $c$ axis, and poorly shaped. Product specifications are set forth in Table IV.

RUN 7 - PROCESS OF INVENTION

In Run 7, 10 ppm sodium dodecylbenzenesulfonate was added in bulk to the sodium carbonate solution prior to crystallization. After the crystallization vessel reached the boiling point, 104°C, a magnesium sulfate solution prepared by dissolving 0.025 g $MgSO_4$ in 25 ml water, was continuously added to the sodium carbonate solution present in the crystallizer to maintain a total of 50 ppm $Mg^{+2}$ during crystallization. During crystallization, the crystals produced had a uniform particle size distribution. The crystals produced showed no twinning, no agglomeration, had sharp angles, and were blocky, that is, were short in the $b$ axis, and thick in the $c$ axis. Product specifications are set forth in Table IV.

COMPARATIVE RUN H

In Comparative Run H, the procedure of Run 7 was repeated except in the absence of 10 ppm sodium dodecylbenzenesulfonate. During crystallization, the crystals produced did not have a uniform particle size distribution. The crystals produced were not smooth but had a striated appearance, and they were long in the $b$ axis, and thick in the $c$ axis. Furthermore, the frangibility of the crystals produced is substantially higher than those produced according to Run 7. Accordingly, the crystals of Run H would tend to break easily and cause objectionable dusting when handled. Product specifications are set forth in Table IV.

The frangibility test was conducted as follows. A sample of the dried sodium carbonate crystals is screened and 100 grams of the $-10 + 100$ mesh (U.S. Standard Mesh) fraction is placed on a 100 mesh screen in a RO-TAP apparatus. Three 3.5 cm. diameter rubber balls, each weighing about 28 grams, are placed in the 100 mesh screen, covered, and RO-TAP is activated for 15 minutes. The fraction passing through the 100 mesh screen, that is the $-100$ mesh fraction, compared to the weight of the sample, is reported as percent frangibility. The smaller the percent frangibility, the more resistant the sample is to breakdown.

The invention being thus described, it will be obvious that the same may be varied in many ways. Such variations are not to be regarded as a departure from the spirit and scope of the invention, and all such modifications are intended to be included within the scope of the following claims.

TABLE I

| Example 1 | Particle Size Distribution (weight %) (U.S. Standard Mesh) | | | | | Bulk Density (lb/ft³) | Crystal Axis Ratio a:b:c | Comments |
|---|---|---|---|---|---|---|---|---|
| | +50 | +70 | +100 | +200 | −200 | | | |
| Run A Blank | 5 | 16 | 59 | 97 | 3 | 52 | 0.26:1:0.17 | Fig. 1 |
| Run B 50 ppm $Mg^{+2}$ | 26 | 58 | 82 | 95 | 5 | 56 | 0.28:1:0.45 | Fig. 2 |
| Run C 10 ppm SDBS* | 17 | 43 | 76 | 97 | 3 | 59 | 0.36:1:0.19 | Fig. 3 |
| Run 1 50 ppm $Mg^{+2}$ and 10 ppm SDBS* | 7 | 22 | 51 | 89 | 11 | 53 | 0.33:1:0.81 | Fig. 4 |

*SDBS stands for sodium dodecylbenzenesulfonate.

TABLE II

| Example 2 | Particle Size Distribution (weight %) (U.S. Standard Mesh) | | | | | Bulk Density (lb/ft³) | Crystal Axis Ratio a:b:c | Comments |
|---|---|---|---|---|---|---|---|---|
| | +50 | +70 | +100 | +200 | −200 | | | |
| Run D Blank | 7 | 20 | 63 | 96 | 4 | 53 | 0.25:1:0.14 | Fig. 5 |
| Run 2 50 ppm $Mg^{+2}$ and 10 ppm SDBS* | 34 | 49 | 63 | 91 | 9 | 63 | 0.53:1:0.70 | Fig. 6 |
| Run 3 50 ppm $Mg^{+2}$ and 10 ppm SDBS* | 16 | 34 | 63 | 96 | 4 | 57 | 0.41:1:0.25 | Fig. 7 |

*SDBS stands for sodium dodecylbenzenesulfonate.

TABLE III

| Example 3 | Particle Size Distribution (weight %) | | | | | Bulk Density (lb/ft³) | Comments |
|---|---|---|---|---|---|---|---|
| | +50 | +70 | +100 | +200 | −200 | | |
| | (U.S. Standard Mesh) | | | | | | |
| Run E Blank | 4 | 14 | 44 | 94 | 6 | 48 | Fig. 8 |
| Run 4 50 ppm $Mg^{+2}$ and 20 ppm SDBS* | 5 | 19 | 69 | 91 | 9 | 62 | Fig. 9 |
| Run 5 100 ppm $Mg^{+2}$ and 20 ppm SDBS* | 10 | 37 | 63 | 83 | 17 | 60 | Fig. 10 |
| Run 6 20 ppm $Mg^{+2}$ and 10 ppm SDBS* | 4 | 14 | 47 | 96 | 4 | 61 | |
| Run F 50 ppm $Mg^{+2}$ and 100 ppm $Ca^{+2}$ | 4 | 13 | 36 | 92 | 9 | 60 | Fig. 11 |

*SDBS stands for sodium dodecylbenzenesulfonate.

TABLE IV

| Example 4 | Particle Size Distribution (weight %) | | | | | Bulk Density (lb/ft³) | Crystal Axis Ratio a:b:c | Frangibility |
|---|---|---|---|---|---|---|---|---|
| | +50 | +70 | +100 | +200 | −200 | | | |
| | (U.S. Standard Mesh) | | | | | | | |
| Run G Blank | 27 | 65 | 89 | 97 | 3 | 59 | 0.40:1:0.31 | — |
| Run 7 50 ppm $Mg^{+2}$ and 10 ppm SDBS* | 42 | 67 | 87 | 98 | 2 | 65 | 0.45:1:0.72 | 1.6 |
| Run H 50 ppm $Mg^{+2}$ | 20 | 53 | 78 | 99 | 1 | 66 | — | 6.1 |

*SDBS stands for sodium dodecylbenzenesulfonate.

What is claimed is:

1. A process for producing sodium carbonate monohydrate crystals having a high bulk density, blocky crystal shape, and uniform particle size distribution from an aqueous solution of sodium carbonate; which comprises: adding to said aqueous solution of sodium carbonate a crystal growth additive system consisting essentially of about 20 to about 100 ppm $Mg^{+2}$ and about 5 to about 20 ppm sodium dodecylbenzenesulfonate based on the sodium carbonate solution; crystallizing sodium carbonate monohydrate from the sodium carbonate solution; and recovering the sodium carbonate monohydrate crystals.

2. The process of claim 1, wherein the sodium carbonate monohydrate is crystallized in the presence of about 40 to about 60 ppm $Mg^{+2}$ and about 6 to about 15 ppm sodium dodecylbenzenesulfonate.

3. The process of claim 1, wherein the sodium carbonate monohydrate is crystallized in the presence of about 50 ppm $Mg^{+2}$ and about 10 ppm sodium dodecylbenzenesulfonate.

4. The process of claim 1, wherein $Mg^{+2}$ and sodium dodecylbenzenesulfonate are added to the sodium carbonate solution as the sodium carbonate solution is fed to the crystallizer.

5. The process of claim 1, where sodium dodecylbenzenesulfonate is added to the sodium carbonate solution as the sodium carbonate solution is fed to the crystallizer and $Mg^{+2}$ is added to the sodium carbonate solution during crystallization.

6. The process of claim 1, wherein the crystallization process is a continuous one.

7. The process of claim 1, wherein the $Mg^{+2}$ employed is magnesium sulfate.

* * * * *

UNITED STATES PATENT OFFICE
CERTIFICATE OF CORRECTION

PATENT NO. : 3,975,499
DATED : August 17, 1976
INVENTOR(S) : JOHN WALDEN

It is certified that error appears in the above-identified patent and that said Letters Patent are hereby corrected as shown below:

Column 1, line 14 "trana" should read --trona--.

Column 1, line 48 "consists" should read --consist--.

Column 3, line 12 "mg$^{+2}$" should read --Mg$^{+2}$--.

Column 3, line 23 "((-70 +100 mesh)" should read --(-70 +100 mesh)--.

Column 3, line 43 "consistant" should read --consistent--.

Column 4, line 5 "article" should read --particle--.

Column 7, line 46 "specification" should read --specifications--.

Column 8, line 9 "MgSo$_4$" should read --MgSO$_4$--.

Column 8, line 21 "sodoium" should read --sodium--.

UNITED STATES PATENT OFFICE
CERTIFICATE OF CORRECTION

PATENT NO. : 3,975,499

DATED : August 17, 1976

INVENTOR(S) : JOHN WALDEN

It is certified that error appears in the above-identified patent and that said Letters Patent are hereby corrected as shown below:

Column 11, line 37, Claim 1 "from an aqueous solution of sodium carbonate," should read --from an aqueous solution of sodium carbonate wherein said aqueous solution of sodium carbonate contains less than about 20 ppm $Mg^{+2}$--.

Column 11, lines 46 to 49, Claim 2:
"The process of claim 1, wherein the sodium carbonate monohydrate is crystallized in the presence of about 40 to about 60 ppm $Mg^{+2}$ and about 6 to about 15 ppm sodium dodecylbenzenesulfonate."

should read as follows:
--The process of claim 1, wherein about 40 to about 60 ppm $Mg^{+2}$ and about 6 to about 15 ppm sodium dodecylbenzenesulfonate is added to said aqueous solution of sodium carbonate.--

Column 12, lines 32 to 35, Claim 3:
"The process of claim 1, wherein the sodium carbonate monohydrate is crystallized in the presence of about 50 ppm $Mg^{+2}$ and about 10 ppm sodium dodecylbenzenesulfonate."

Claim 3 should read as follows:

UNITED STATES PATENT OFFICE
CERTIFICATE OF CORRECTION

PATENT NO. : 3,975,499

DATED : August 17, 1976

INVENTOR(S) : JOHN WALDEN

It is certified that error appears in the above-identified patent and that said Letters Patent are hereby corrected as shown below:

--The process of claim 1, wherein about 50 ppm $Mg^{+2}$ and about 10 ppm sodium dodecylbenzenesulfonate is added to said aqueous solution of sodium carbonate.--

Signed and Sealed this

First Day of March 1977

[SEAL]

Attest:

RUTH C. MASON
*Attesting Officer*

C. MARSHALL DANN
*Commissioner of Patents and Trademarks*